April 11, 1950 C. M. LOWRY 2,503,500

HEADLAMP

Filed Dec. 20, 1944

INVENTOR.
CLYDE M. LOWRY
BY William E. Hall
ATTORNY

Patented Apr. 11, 1950

2,503,500

UNITED STATES PATENT OFFICE 2,503,500

HEAD LAMP

Clyde M. Lowry, Los Angeles, Calif.

Application December 20, 1944, Serial No. 569,043

4 Claims. (Cl. 240—41.3)

My invention relates to a vehicle headlamp.

One of the principal objects of this invention is to provide a vehicle headlamp for preventing glare, which is particularly simple and economical of construction, and one which is simple and easy to adjust or manipulate to prevent glare at any particular instant.

Another important object of this invention is to provide a novel arrangement of simple lenses, in relation to the source of light and a shutter, to effect the function above mentioned.

An important object also of this invention is to provide a novelly shaped and economical lens for the front of the headlamp for restricting the issuing rays to a greater extent vertically than laterally.

A further important object of this invention is to provide a novel screen or shutter arrangement for a headlamp to indicate to the approaching vehicle the nature or type of the vehicle having such shutter or screen, and also to provide such vehicle-type designating means in combination with an anti-glare shutter of the class described whereby the vehicle-type designation is uniformly indicated at the top of the illuminating beam of the headlamp.

A still further object of this invention is to provide a fog or similar light in combination with a headlamp whereby the usual road-illuminating headlight may be readily temporarily converted, and as desired, into a fog or similar light, an object of this invention also being to provide an anti-glare vehicle headlamp, as above described, with such fog or similar light feature.

With these and other objects in view, as will appear hereinafter, I have devised a vehicle headlamp having certain novel features of construction, combination, and arrangement of parts and portions, as will be hereinafter described in detail, and particularly set forth in the appended claims, reference being had to the accompanying drawings, and to the characters of reference thereon, which form a part of this application, in which:

Figure 1:
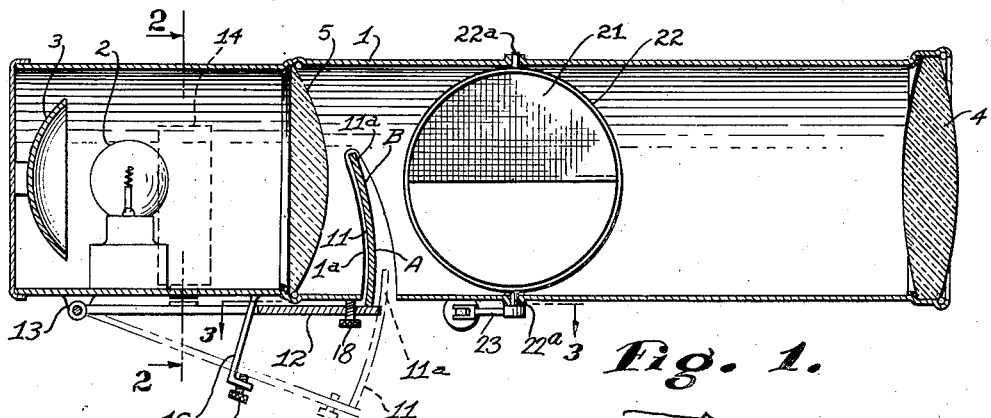
Fig. 1 is a longitudinal sectional view through the median portion of a head lamp incorporating my invention.
Figures 2, 3:
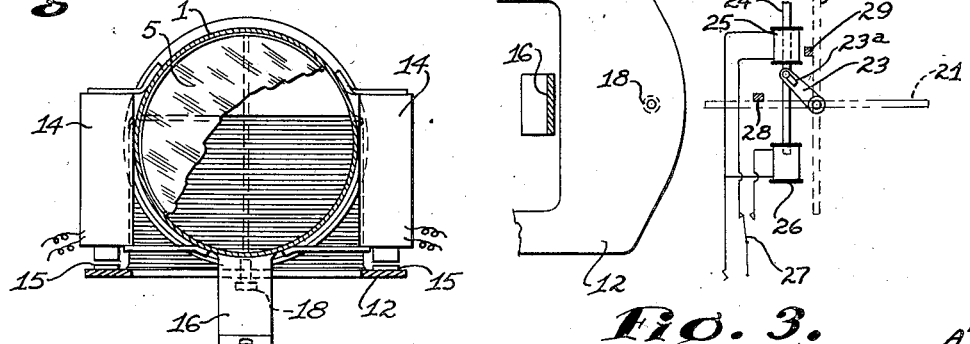
Fig. 2 is a transverse sectional view thereof, taken through 2—2 of Fig. 1.
Fig. 3 is an enlarged sectional view in plan, taken through 3—3 of Fig. 1.

My headlamp, in the form of construction shown in Fig. 1, is enclosed in a housing which may be substantially cylindrical. If desired, of course, this housing may be enclosed in a streamlined housing of conventional design, which is not here shown.

The arrangement of the source of light and lenses may be similar to that in the ordinary projector, except as herein specifically indicated. Near the rear end of the housing, and in axial alignment therewith is the source of light 2, which may be a light bulb of conventional form. Between the source of light or light bulb 2 and the rear end of the housing is a reflector 3. At the forward or outer end of the housing is a lens 4. Between the source of light and the outer lens 4 is a condenser lens 5. The condenser lens is plano-convex and is positioned with the plane face directed towards the source of light. The arrangement is such that the light source 2 is located substantially at the center of curvature of the reflector 3 so that rays reflected from the reflector are directed back substantially through the light source 2 and emanate in a substantially parallel beam from the forward side of the condenser lens 5.

The forward lens 4 is of double convex construction so that the lateral rays diverge from the lens 4 at a greater angle than the vertical rays, that is, when the latter are considered from a vertical plane passing through the focal axis.

Figure 4:
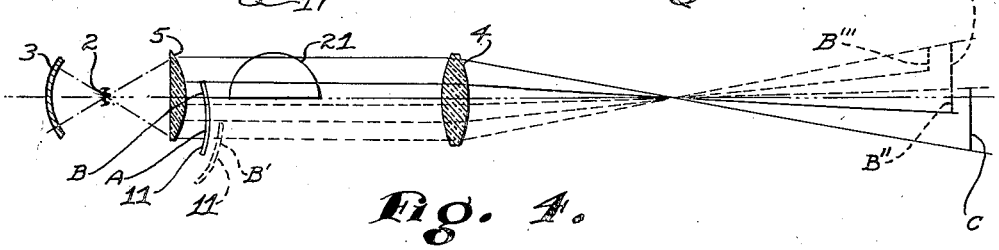
Fig. 4 is a diagrammatic view similar to that shown in Fig. 1, but showing the approximate direction of the rays of light from the source, as they appear in a vertical plane passing through the optical axis of the lens; and, Fig. 5 is a fragmentary view showing the approximate direction of the rays issuing from the headlamp taken in a horizontal plane.
Figure 5:
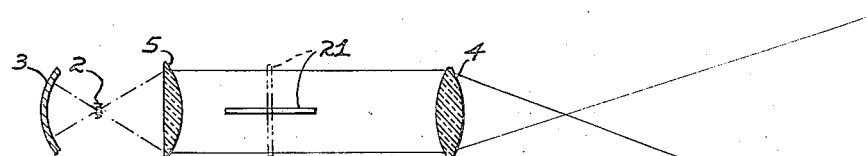

This lens is of double convex construction with the opposite faces, considered from a horizontal cross-section, of greater curvature than when considered from a vertical section or a vertical plane, as shown respectively in Figs. 5 and 4 of the drawings. The nature of the emanating rays considered vertically and horizontally are indicated in Figs. 4 and 5.

Immediately in front of the condenser lens 5 is provided a shutter or screen member 11, which, when used for screening or excluding a portion of the rays of light, may be opaque, but for other purposes, as will be described hereafter, it may be translucent, of various configurations, or varicolored. As shown in the drawings, the screen member 11 may extend transversely through and be guided in its movements in a slot 1ª in the side wall of the housing. The screen is shown as being carried at the forward end of an arm 12 which is pivotally mounted at its rear end on a horizontal axis and on the lower portion of the housing 1, and preferably on a bracket 13 carried by the housing. At the opposite sides of the housing are provided electro-magnets 14 which are located intermediate the pivoted free ends of the arm 12. From the lateral sides of the arm 12 extend armatures 15 which may be attracted by the electro-magnets 14 for raising the screen member 11, at the option of the operator, in front of the condenser lens 5. The energy for the electro-magnet 14 may be controlled in any suitable manner (not shown) by the operator from his usual position.

The headlamp is normally used or operated with the shutter or screen member 11 in a lower position, shown by dotted lines, but when it is desired to lower the issuing light, that is to exclude the upper rays, the shutter or screen member 11 is raised by means of the electro-magnets.

It is often desirable to know or determine the nature of the approaching vehicle, that is, whether it is a truck, passenger automobile, motorcycle, or the like. Such information may be readily conveyed by making the screen member 11 transluscent and coloring the same, such as orange, blue, and yellow. For an emergency vehicle, the screen may be red.

Fig. 4 of the drawing shows by solid lines screen member 11 in a raised position and by dotted lines in a lowered or normal position. In this view, though the anti-glare and vehicle distinguishing portions are shown as or are embodied in one element, the anti-glare portion of the screen is for convenience designated A, and the vehicle-designating portion is designated B. B' shows the vehicle designating or colored portion in a normal position in which the rays from the source 2 direct a colored light at the top of the beam, as shown by the dotted line, designated B'''. When the screen member is raised, the portion A (which may be similarly colored) is intended to exclude the bright rays at the bottom of the beam within the headlamp, thereby screening the bright rays at the top of the issuing beam, as indicated by the broken line designated A', the vehicle distinguishing rays, in this instance being designated B''.

At the lower portion of the housing 1 is a bracket 16 which extends downwardly from the housing between the lateral sides of the arm 12. At the lower portion of the bracket is provided an adjusting screw 17 for adjusting the low and normal position of the arm 12 and thereby limiting the low and normal position of the vehicle designating screen of the portion 11a.

At the free end of the arm 12 is provided an adjustable stop screw 18 for limiting the upper portion of the arm and thereby adjusting the upper position of the anti-glare or opaque screen A of the member 11 and the upper portion of the colored or vehicle-designating screen B of the portion 11a.

The means of transforming the headlamp into a fog light, or of providing a fog light within the headlamp is effected by a semi-circular amber or yellow colored transluscent screen 21 which is carried at the upper portion of an annular support 22. At the upper and lower portions of the annular support are provided trunnions 22a which support the fog-light-forming screen on a vertical axis within the housing 1. To the lower trunnion 22a, which extends below the housing 1, is secured an arm 23 which is pivotally connected to a member 24 serving as a movable armature of two electro-magnets 25 and 26. The arm 23 may be provided with a slot 23a to permit the arm 23 readily to be rotated about its axis. When the electro-magnet 25 is energized by the two-way switch 27, the fog light screen 21 is shifted to the position shown by dot and dash lines. When the other electro-magnet 26 is energized by throwing the switch 27 in the opposite direction, the armature 24 is drawn in the opposite direction, causing the fog light screen 21 to be shifted into the dotted line position. There may be provided stops 28 and 29 for limiting the two positions of the fog light screen.

Though I have shown and described a particular construction, combination, and arrangement of parts and portions, of my headlamp, I do not wish to be limited to the same, but desire to include in the scope of my invention the construction, combination, and arrangement substantially as set forth in the appended claims.

I claim:

1. In a vehicle headlamp, a housing, a source of light at one end, a lens at the opposite end, an anti-glare screen rotatably mounted therein on an axis normal to the axis of said lens, said screen having a vehicle-distinguishing portion at the upper edge thereof, and means for rotating said screen to positive in alignment with and normal to the axis of the lens.

2. In a vehicle headlamp, the combination of: a tubular housing having a transverse slot; a source of light adjacent one end of the housing; a reflector disposed rearwardly of said source of light within said housing; a double convex lens within said housing at the forward end thereof through which a beam of light projected from said reflector is emitted from the housing; a plano-convex condenser lens disposed in said housing between said source of light and the double convex lens; a U-shaped arm having its legs pivoted externally of said housing and on an axis extending transversely of the housing; a screen carried by a cross-member of the arm and adapted to move in said slot to one position to exclude a portion of the light rays of the beam of light transmitted to said double convex lens, and to a second position outside the beam of light; and stop means for limiting the pivotal movement of said arm in either direction.

3. In a vehicle headlamp, the combination of: a tubular housing having a curved transverse slot; a source of light adjacent one end of the housing; a reflector disposed rearwardly of said source of light within said housing; a double convex lens within said housing at the forward end thereof through which a beam of light projected from said reflector is emitted from the housing; a plano-convex condenser lens disposed in said housing between said source of light and the double convex lens; a U-shaped arm having its legs pivoted externally of said housing and on an axis extending transversely of the housing; a curved screen carried by a cross-member of the arm and adapted to move in said slot to one position to exclude a portion of the light rays of the beam of light transmitted to said double convex lens, and to a second position outside the beam of light; stop means for limiting the pivotal movement of said arm in either direction; and electromagnetic means for actuating said arm.

4. In a vehicle headlamp, the combination of: a horizontal tubular housing having a transverse curved slot in its lower portion; a source of light adjacent one end of the housing; a reflector disposed rearwardly of said source within the housing; a double convex lens within the housing at the forward end thereof through which a beam of light projected from said reflector is emitted from the housing; a plano-convex condenser lens disposed in said housing between said source of light and said double convex lens; a U-shaped arm having its opposite legs pivoted externally of said housing and on an axis extending transversely of said housing; a curved screen carried by a cross-member of the arm and adapted to move in said slot to an upper position to exclude a portion of the light rays of the beam transmitted to said double convex lens and to a downward position outside the beam of light, said arm pivoting to downward position under the influence of gravity; electro-magnetic means for pivoting said arm upwardly; and stop means for limiting the pivotal movement of the arm in either direction.

CLYDE M. LOWRY.

REFERENCES CITED

The following references are of record in the file of this patent:

UNITED STATES PATENTS

| Number | Name | Date |
|---|---|---|
| 1,167,546 | Danheiser | Jan. 11, 1916 |
| 1,389,291 | Bone | Aug. 30, 1921 |
| 1,450,642 | Ott et al. | Apr. 3, 1923 |
| 1,506,064 | Holland et al. | Aug. 26, 1924 |
| 1,539,090 | King | May 26, 1925 |
| 1,581,581 | Lewis | Apr. 20, 1926 |
| 1,598,044 | Bone | Aug. 31, 1926 |
| 1,604,370 | Upton | Oct. 26, 1926 |
| 1,633,387 | Shippey et al. | June 21, 1927 |
| 1,669,740 | Dewey | May 15, 1928 |
| 1,677,678 | Maurer | July 17, 1928 |
| 1,928,431 | Morshead et al. | Sept. 26, 1933 |
| 1,950,576 | Stafford | Mar. 13, 1934 |
| 2,170,552 | DePorter | Aug. 22, 1939 |
| 2,300,097 | Briehl | Oct. 27, 1942 |
| 2,338,901 | Chiti | Jan. 11, 1944 |

FOREIGN PATENTS

| Number | Country | Date |
|---|---|---|
| 579,785 | France | Aug. 12, 1924 |
| 752,908 | France | 1933 |
| 800,039 | France | of 1936 |
| 509,337 | Great Britain | of 1939 |